United States Patent
Hossain et al.

(10) Patent No.: US 12,399,341 B2
(45) Date of Patent: Aug. 26, 2025

(54) HEAD-MOUNTED ELECTRONIC DEVICE WITH ALIGNMENT SENSORS

(71) Applicant: Apple Inc., Cupertino, CA (US)

(72) Inventors: Muhammad F. Hossain, Santa Clara, CA (US); Samuel A. Resnick, San Francisco, CA (US)

(*) Notice: Subject to any disclaimer, the term of this patent is extended or adjusted under 35 U.S.C. 154(b) by 0 days.

(21) Appl. No.: 18/505,895

(22) Filed: Nov. 9, 2023

(65) Prior Publication Data

US 2024/0077695 A1  Mar. 7, 2024

Related U.S. Application Data

(63) Continuation of application No. 17/202,198, filed on Mar. 15, 2021, now Pat. No. 11,860,439.

(60) Provisional application No. 63/020,630, filed on May 6, 2020.

(51) Int. Cl.
| | |
|---|---|
| *G02B 7/02* | (2021.01) |
| *G01B 7/31* | (2006.01) |
| *G01B 11/27* | (2006.01) |
| *G02B 25/00* | (2006.01) |
| *G06T 3/18* | (2024.01) |
| *G06T 5/80* | (2024.01) |

(52) U.S. Cl.
CPC ............. *G02B 7/02* (2013.01); *G01B 7/31* (2013.01); *G01B 11/272* (2013.01); *G02B 25/001* (2013.01); *G06T 3/18* (2024.01); *G06T 5/80* (2024.01)

(58) Field of Classification Search
CPC .......... G02B 7/02; G02B 25/001; G06T 3/18; G06T 5/80; G01B 7/31; G01B 11/272
USPC ............ 359/630, 643, 694; 345/7–9
See application file for complete search history.

(56) References Cited

U.S. PATENT DOCUMENTS

| | | | |
|---|---|---|---|
| 7,002,551 | B2 | 2/2006 | Azuma et al. |
| 9,599,825 | B1 | 3/2017 | Mullins et al. |
| 9,710,057 | B2 | 7/2017 | Mikhailov et al. |
| 9,788,714 | B2 | 10/2017 | Krueger |
| 10,054,796 | B2 | 8/2018 | Bickerstaff et al. |
| 10,078,377 | B2 | 9/2018 | Balan et al. |
| 10,360,877 | B2 | 7/2019 | Osman et al. |
| 2010/0309097 | A1 | 12/2010 | Raviv et al. |
| 2014/0375681 | A1 | 12/2014 | Robbins et al. |
| 2016/0262608 | A1 | 9/2016 | Krueger |
| 2017/0232346 | A1 | 8/2017 | Rofougaran et al. |

(Continued)

*Primary Examiner* — William Choi
(74) *Attorney, Agent, or Firm* — Treyz Law Group, P.C.; G. Victor Treyz; Kendall P. Woodruff

(57) ABSTRACT

A head-mounted device may have a head-mounted housing. Optical components may be supported by the head-mounted housing. The optical components may include cameras such as front-facing cameras and/or movable optical modules that have displays for displaying images to eye boxes. Sensors may be provided in the head-mounted device to detect changes in orientation between respective optical modules, between respective portions of a chassis, display cover layer, or other head-mounted support structure in the housing, between optical components such as cameras, and/or between optical components and housing structures. Information from these sensors can be used to measure image misalignment such as image misalignment associated with misaligned cameras or misalignment between optical module images and corresponding eye boxes.

16 Claims, 15 Drawing Sheets

(56) References Cited

U.S. PATENT DOCUMENTS

2020/0018968 A1* 1/2020 Edwin ................ G02B 27/0172

* cited by examiner

HEAD-MOUNTED ELECTRONIC DEVICE WITH ALIGNMENT SENSORS

This application is a continuation of patent application Ser. No. 17/202,198, filed Mar. 15, 2021, which claims the benefit of provisional patent application No. 63/020,630, filed May 6, 2020, both of which are hereby incorporated by reference herein in their entireties.

FIELD

This relates generally to electronic devices, and, more particularly, to electronic devices such as head-mounted devices.

BACKGROUND

Electronic devices such as head-mounted devices may have displays for displaying images and may have other optical components.

SUMMARY

A head-mounted device may have a head-mounted housing. Optical components may be supported by the head-mounted housing. The optical components may include cameras such as front-facing cameras and/or optical modules that have displays for displaying images to eye boxes.

Sensors may be provided in the head-mounted device to detect changes in position between portions of the head-mounted device. These changes may include changes in the positions between optical modules, between portions of a chassis, display cover layer, or other head-mounted support structure, between optical components such as cameras, and/or between optical components and housing structures. Information from these sensors can be used to measure image misalignment such as image misalignment associated with misaligned cameras or image misalignment between optical module images and the eye boxes to which these images are being provided. During operation of the head-mounted device, images can be warped to compensate for measured misalignment.

DETAILED DESCRIPTION

An electronic device such as a head-mounted device may have a front face that faces away from a user's head and may have an opposing rear face that faces the user's head. Optical modules may be used to provide images to a user's eyes. The positions of the optical modules may be adjusted to accommodate different user interpupillary distances. The head-mounted device may have actuators and optical module guide structures to allow the optical module positions to be adjusted. The head-mounted device may also have other optical components such as front-facing cameras.

Figure 1:
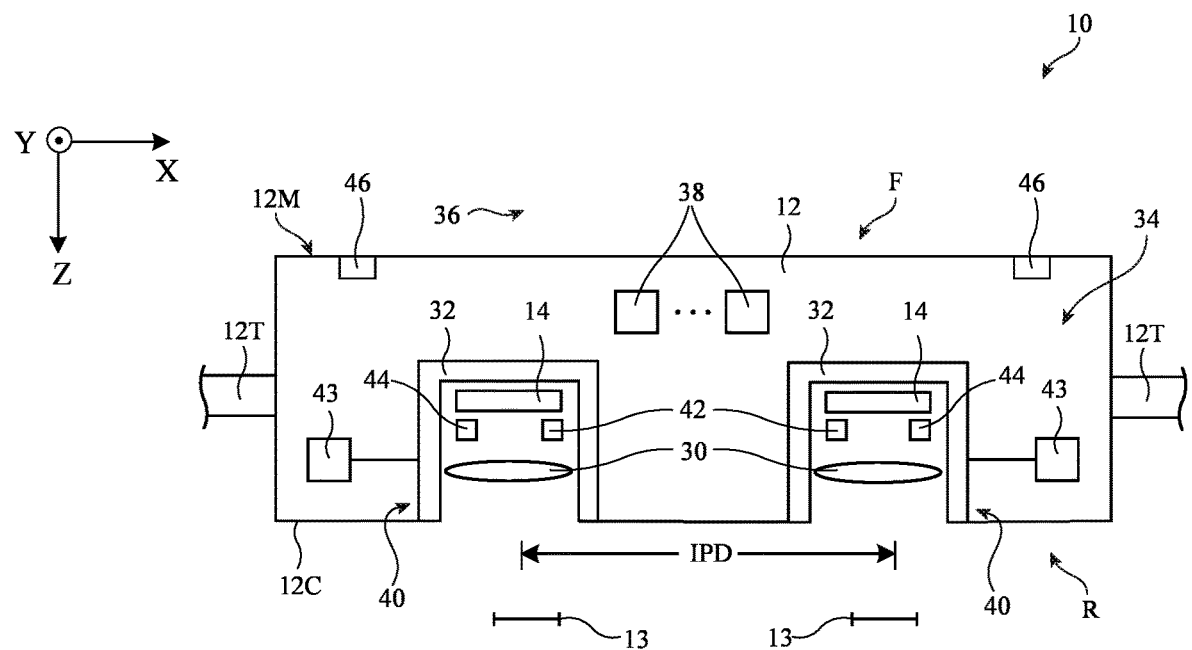
FIG. 1 is a top view of an illustrative head-mounted device in accordance with an embodiment.

A top view of an illustrative head-mounted device is shown in FIG. 1. As shown in FIG. 1, head-mounted devices such as electronic device 10 may have head-mounted support structures such as housing 12. Housing 12 may include portions (e.g., head-mounted support structures 12T) to allow device 10 to be worn on a user's head. Support structures 12T may be formed from fabric, polymer, metal, and/or other material. Support structures 12T may form a strap or other head-mounted support structures to help support device 10 on a user's head. A main support structure (e.g., a head-mounted housing such as main housing portion 12M) of housing 12 may support electronic components such as displays 14.

Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures and these rigid walls may optionally be covered with electrical components, fabric, leather, or other soft materials, etc. Housing portion 12M may also have internal support structures such as a frame and/or structures that perform multiple functions such as controlling airflow and dissipating heat while providing structural support. The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, a hat, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as cover 12C. The presence of cover 12C on rear face R may help hide internal housing structures, internal components 38, and other structures in interior region 34 from view by a user.

Device 10 may have one or more cameras such as cameras 46 of FIG. 1. For example, forward-facing (front-facing) cameras may allow device 10 to monitor movement of the device 10 relative to the environment surrounding device 10 (e.g., the cameras may be used in forming a visual odometry system or part of a visual inertial odometry system). Forward-facing cameras may also be used to capture images of the environment that are displayed to a user of the device 10. If desired, images from multiple forward-facing cameras may be merged with each other and/or forward-facing camera content can be merged with computer-generated content for a user.

Device 10 may have any suitable number of cameras 46. For example, device 10 may have K cameras, where the value of K is at least one, at least two, at least four, at least six, at least eight, at least ten, at least 12, less than 20, less than 14, less than 12, less than ten, 4-10, or other suitable value. Cameras 46 may be sensitive at infrared wavelengths (e.g., cameras 46 may be infrared cameras), may be sensitive at visible wavelengths (e.g., cameras 46 may be visible cameras), and/or cameras 46 may be sensitive at other wavelengths. If desired, cameras 46 may be sensitive at both visible and infrared wavelengths.

Cameras 46 that are mounted on front face F and that face outwardly (towards the front of device 10 and away from the user) may sometimes be referred to herein as forward-facing or front-facing cameras. Cameras 46 may capture visual odometry information, image information that is processed to locate objects in the user's field of view (e.g., so that virtual content can be registered appropriately relative to real-world objects), image content that is displayed in real time for a user of device 10, and/or other suitable image data.

Device 10 may have left and right optical modules 40. Optical modules 40 support electrical and optical components such as light-emitting components and lenses and may therefore sometimes be referred to as optical assemblies, optical systems, optical component support structures, lens and display support structures, electrical component support structures, or housing structures. Each optical module may include a respective display 14, lens 30, and support structure such as support structure 32. Support structure 32, which may sometimes be referred to as a lens support structure, optical component support structure, optical module support structure, optical module portion, or lens barrel, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30.

Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images.

Lenses 30 may include one or more lens elements for providing image light from displays 14 to respective eyes boxes 13. Lenses may be implemented using refractive glass lens elements, using mirror lens structures (catadioptric lenses), using Fresnel lenses, using holographic lenses, and/or other lens systems.

When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

It may be desirable to monitor the user's eyes while the user's eyes are located in eye boxes 13. For example, it may be desirable to use a camera to capture images of the user's irises (or other portions of the user's eyes) for user authentication. It may also be desirable to monitor the direction of the user's gaze. Gaze tracking information may be used as a form of user input and/or may be used to determine where, within an image, image content resolution should be locally enhanced in a foveated imaging system. To ensure that device 10 can capture satisfactory eye images while a user's eyes are located in eye boxes 13, each optical module 40 may be provided with a camera such as camera 42 and one or more light sources such as light-emitting diodes 44 or other light-emitting devices such as lasers, lamps, etc. Cameras 42 and light-emitting diodes 44 may operate at any suitable wavelengths (visible, infrared, and/or ultraviolet). As an example, diodes 44 may emit infrared light that is invisible (or nearly invisible) to the user. This allows eye monitoring operations to be performed continuously without interfering with the user's ability to view images on displays 14.

Not all users have the same interpupillary distance IPD. To provide device 10 with the ability to adjust the interpupillary spacing between modules 40 along lateral dimension X and thereby adjust the spacing IPD between eye boxes 13 to accommodate different user interpupillary distances, device 10 may be provided with optical module positioning systems in housing 12. The positioning systems may have guide members and actuators 43 that are used to position optical modules 40 with respect to each other.

Actuators 43 can be manually controlled and/or computer-controlled actuators (e.g., computer-controlled motors) for moving support structures (lens barrels) 32 relative to each other. Information on the locations of the user's eyes may be gathered using, for example, cameras 42. The locations of eye boxes 13 can then be adjusted accordingly.

Figure 2:
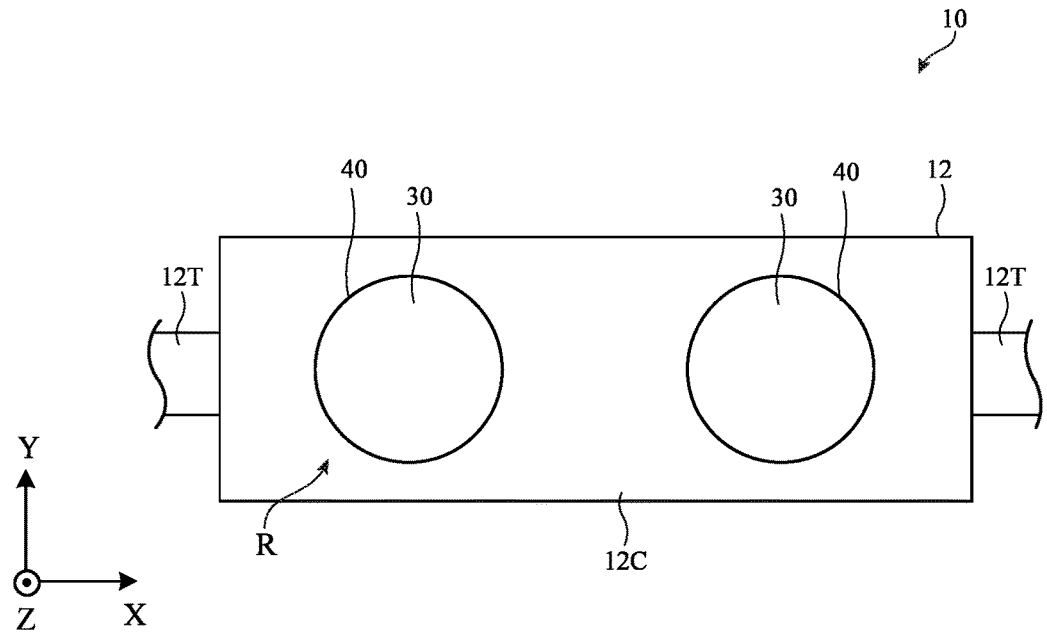
FIG. 2 is a rear view of an illustrative head-mounted device in accordance with an embodiment.

As shown in the rear view of device 10 of FIG. 2, cover 12C may cover rear face R while leaving lenses 30 of optical modules 40 uncovered (e.g., cover 12C may have openings that are aligned with and receive modules 40). As modules 40 are moved relative to each other along dimension X to accommodate different interpupillary distances for different users, modules 40 move relative to fixed housing structures such as the walls of main portion 12M and move relative to each other.

Figure 3:
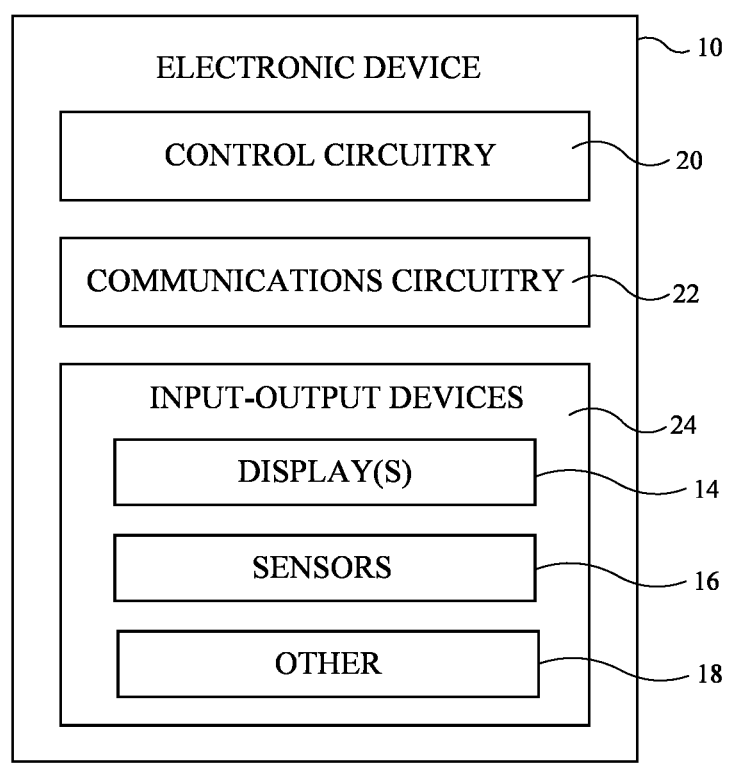
FIG. 3 is a schematic diagram of an illustrative head-mounted device in accordance with an embodiment.

A schematic diagram of an illustrative electronic device such as a head-mounted device or other wearable device is shown in FIG. 3. Device 10 of FIG. 3 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 3.

As shown in FIG. 3, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid-state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors (e.g., cameras), fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, three-dimensional camera systems such as depth sensors (e.g., structured light sensors and/or depth sensors based on stereo imaging devices that capture three-dimensional images) and/or optical sensors such as self-mixing sensors and light detection and ranging (lidar) sensors that gather time-of-flight measurements (e.g., time-of-flight cameras), humidity sensors, moisture sensors, gaze tracking sensors, electromyography sensors to sense muscle activation, facial sensors, interferometric sensors, time-of-flight sensors, magnetic sensors, resistive sensors, distance sensors, angle sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

It is desirable for optical components in device 10 to remain in satisfactory alignment during operation of device 10. Consider, as an example, optical modules 40 and front facing cameras 46. Due to a drop event or other event imparting stress on housing portion 12M, housing portion 12M and the components of housing portion 12M may become deformed and misaligned. For example, the left and right optical modules 40 in device 10 may become misaligned and/or a pair of front-facing cameras 46 may become misaligned. This can adversely affect device performance. For example, if the left and right images being viewed by a user become misaligned with respect to each other, these images may not fuse satisfactorily in the user's vision and/or a user may experience discomfort during image viewing. Similarly, misalignment of cameras 46 can lead to undesired misalignment between captured images.

To ensure that device 10 is comfortable to wear on a user's head, device 10 should not be too heavy or too large. Particularly when using lightweight and compact structures to form device 10, however, there is a risk that excessive stress on the structures of device 10 will adversely affect the alignment of optical components of device 10. To accommodate potential optical component misalignment, device 10 may be provided with sensors that can measure misalignment.

Figure 4:
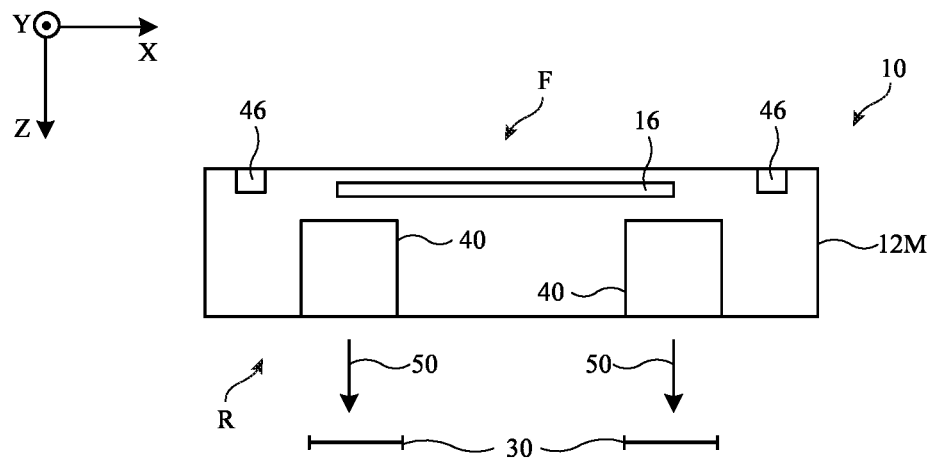
FIG. 4 is a top view of an illustrative head-mounted device in an undeformed configuration in accordance with an embodiment.

Consider, as an example, head-mounted device 10 of FIG. 4. In the configuration of FIG. 4, device 10 has been provided with sensor 16 (e.g., a strain gauge or other sensor). Sensor 16 may, as an example, be coupled to a portion of housing 12M. During operation, sensor 16 can detect when housing 12M has become deformed (e.g., bent) due to a drop event or other stress. As shown in FIG. 4, optical modules 40 provide left and right images to corresponding left and right eye boxes 30 in directions 50 and left and right forward-facing cameras 46 capture corresponding left and right camera images. When housing 12M of FIG. 4 is not deformed as shown in FIG. 4, the images provided by optical modules 40 in directions 50 are aligned with eye boxes 30, so images for the left and right eyes fuse properly into a single image when viewed by the user's left and right eyes. Cameras 46 are also aligned satisfactorily.

Figure 5:
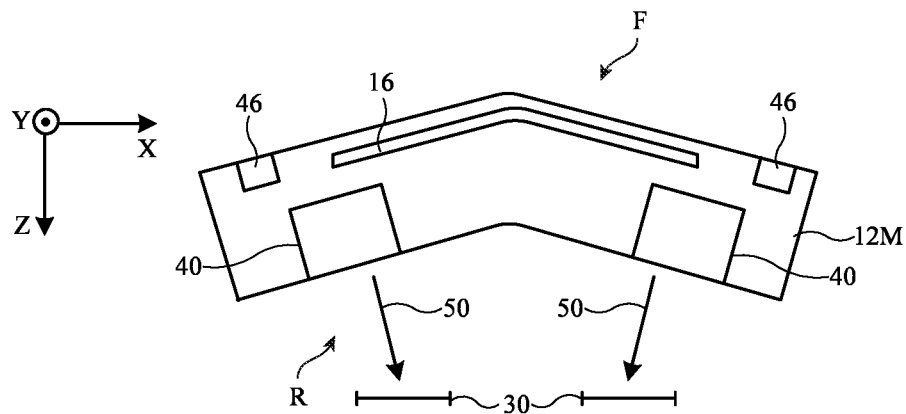
FIG. 5 is a top view of the illustrative head-mounted device of FIG. 4 in a deformed configuration in accordance with an embodiment.

When housing 12M is deformed as shown in FIG. 5, however, the images provided in directions 50 are no longer aligned with eye boxes 30 and/or the images captured by cameras 46 are no longer aligned satisfactorily. Due to the presence of sensors such as sensor 16, image misalignment associated with display images and/or camera images can be detected in real time and appropriate compensating action taken. As an example, if it is determined that an image from a given optical module 40 is rotated with respect to a corresponding eye box 30, device 10 (e.g., control circuitry in device 10 such as control circuitry 20 of FIG. 3) may apply a corresponding image warping process with a corresponding counterrotation to the image being produced by that optical module. This ensures that the images from optical modules 40 are properly aligned with eye boxes 30 and each other, even if optical modules have become physically misaligned. Similarly, images captured by forward facing cameras 46 may be processed to compensate for detected misalignment between the cameras. Configurations where misalignment between cameras and optical modules and/or other optical component misalignment is detected and compensated may also be used.

One or more sensors may be provided to gather information on the positions of structures in device 10. These sensors can produce output that is used in detecting misalignment and may therefore sometimes be referred to as misalignment sensors, position sensors, and/or orientation sensors. The sensors may be strain gauges, optical sensors, radio-frequency sensors, acoustic sensors, magnetic sensors, and/or other sensors that detect deformation of housing 12M and/or other portions of device 10 leading to misalignment of optical components with respect to each other and/or to housing 12.

Using a misalignment sensor, the orientation of housing 12M and/or one or more optical components in housing 12M such as optical modules 40 and/or cameras 46 can be measured. Control circuitry 20 can process the output from one or more orientation sensors in real time and can take suitable action to compensate for the effects of optical component misalignment. As an example, control circuitry 20 can warp or otherwise modify image data (e.g., display output data associated with one or more optical module displays, captured camera images from one or more cameras, etc.) to digitally compensate for misalignment. During image warping, an image is geometrically distorted (e.g., a geometrical image transform is applied to the image such as a shift, shear, rotation, etc.). In this way, device 10 can be operated satisfactorily, even if optical components in device 10 have become misaligned.

Illustrative misalignment sensor configurations are shown in FIGS. 6-20.

Figure 6:
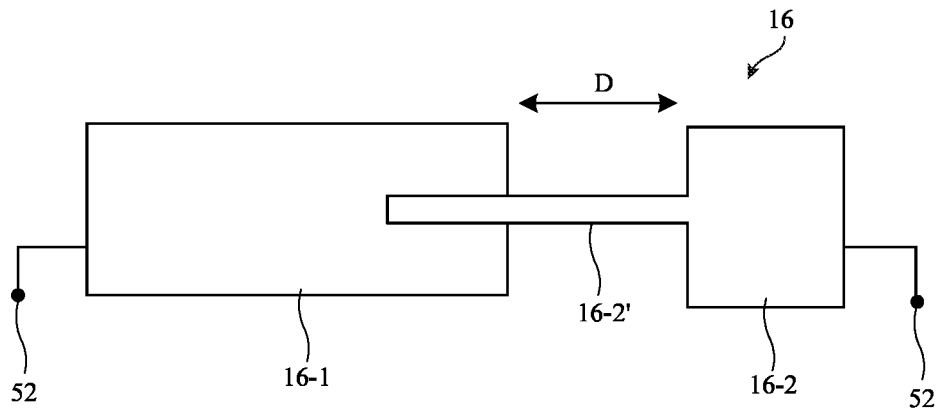
FIG. 6 is a side view of an illustrative resistance-based sensor in accordance with an embodiment.

In the example of FIG. 6, misalignment sensor 16 has a first portion 16-1 and a second portion 16-2. Shaft 16-2' of portion 16-2 moves in and out of portion 16-1 as the distance D between portions 16-1 and 16-2 varies. Sensor 16 may be, for example, a resistance-based sensor (e.g., a potentiometer) that is characterized by a resistance R between its terminals 52 that is proportional to distance D. Resistance-based sensors and other misalignment sensors 16 may be configured to measure changes in displacement (e.g., distance D) and/or changes in angular orientation that are indicative of component movement and/or housing deformation and that are therefore indicative of associated image misalignment.

Figure 7:
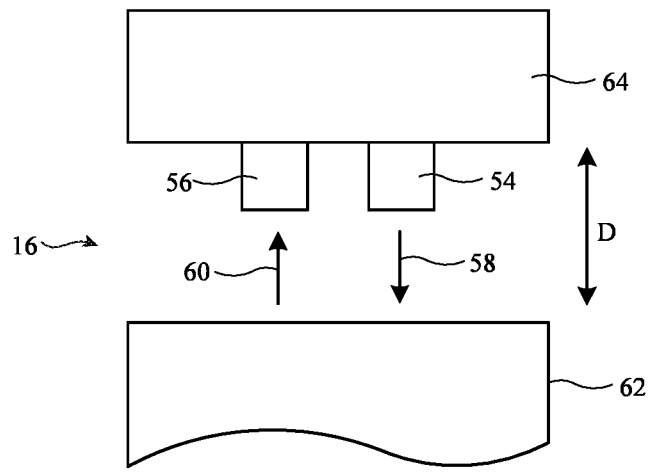
FIG. 7 is a side view of an illustrative sensor that emits signals and detects reflected signals in accordance with an embodiment.

In the example of FIG. 7, sensor 16 has an emitter 54 and a detector 56 for detecting misalignment between structures in device 10 such as structure 64 and structure 62. Emitter 54 may emit signals 58 (e.g., light, radio-frequency signals, acoustic signals such as ultrasonic signals, etc.). Emitted signals 58 reflect from a reflective surface of structure in device 10 such as structure 62 (e.g., a portion of an optical module, a housing structure, a portion of a camera, etc.). Emitted signals 58 that have reflected from structure 62 such as reflected signals 60 are detected by detector 56. The strength of the reflected signals in this example is proportional to distance D and can therefore be used by device 10 (e.g., by sensor 16 and/or control circuitry 20) to measure changes to distance D and/or changes in the angle between structures in device 10.

Figure 8:
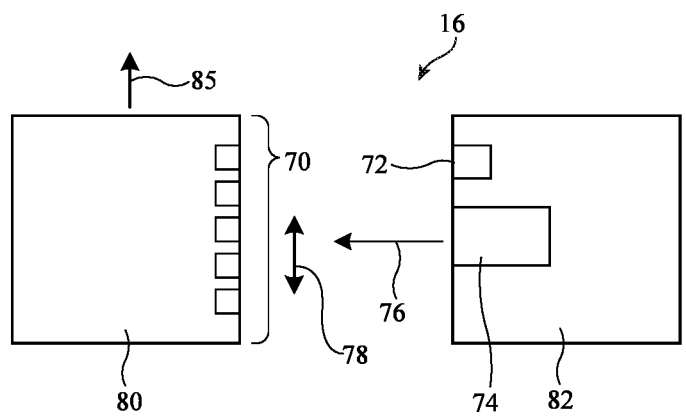
FIG. 8 is a side view of an illustrative optical sensor such as a scanning light beam sensor that monitors a pattern in accordance with an embodiment.

In the example of FIG. 8, scanning light beam sensor 16 has a patterned target such as target 70. Sensor 16 of FIG. 8 is used in detecting changes in the angular orientation between structures 80 and 82. Patterned target 70, which may sometimes be referred to as a target, pattern, fiducial, etc., may include, for example, a bar code or other recognizable pattern. Sensor 16 may include a light emitter such as scanning light beam emitter 74. Emitter 74 may be a scanning laser device or other devices that emits a beam of light 76 that is scanned across target 70 in directions 78.

Detector 72 detects corresponding reflected light. Because of the recognizable pattern of target 70, lateral shifts in the position of target 70 can be detected. Sensor 16 can thereby detect when the angle between structures 80 and 82 has changed (e.g., because structure 80 has shifted laterally in direction 85).

Figure 9:
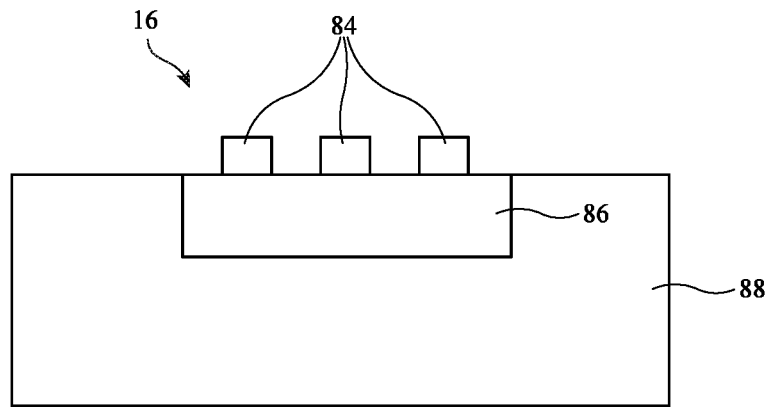
FIGS. 9, 10, and 11 are cross-sectional side views of illustrative strain gauge sensors in accordance with embodiments.

If desired, a misalignment sensor may include a strain gauge. FIG. 9 is a cross-sectional side view of an illustrative strain gauge formed from conductive trace 84 (e.g., a conductive trace with a serpentine path). Trace 84 is supported by one or more structures in device 10 (e.g., portions of housing 12, optical modules 40, cameras 46, etc.). When trace 84 bends, the effective length of trace 84 and therefore the resistance of trace 84 changes. A Wheatstone bridge or other resistance measurement circuitry that is coupled to the terminals of trace 84 may be used by control circuitry 20 to measure strain.

Figure 10:
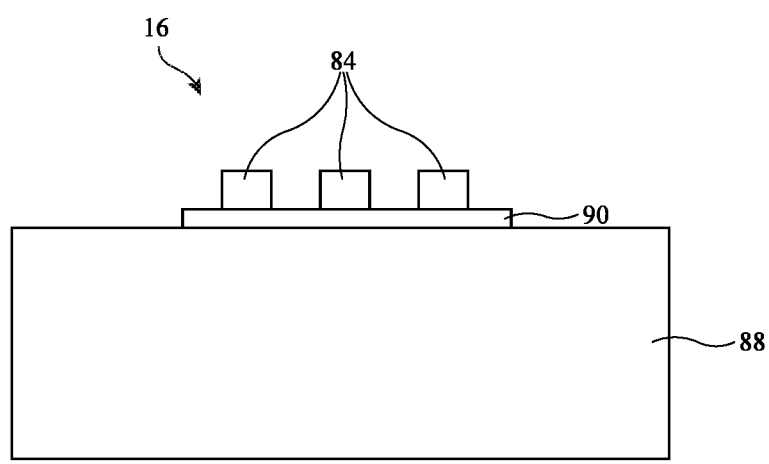

In the example of FIG. 9, strain gauge metal trace 84 has been formed using a laser activation process. This process, which may sometimes be referred to as laser direct structuring, involves exposing laser activatable material such as material 86 (e.g., polymer with sensitizers or other material that is sensitized to light exposure) to laser light in a desired trace pattern, followed by electrodeposition to grow trace 84 in the exposed areas. Material 86 may be formed from a different material than other structures in device 10 (e.g. material 86 may be a first shot of polymer and supporting material 88 may be a second shot of polymer that forms a portion of housing 12 and/or other structure in a head-mounted device) or a single material may be used in forming these structures. In the example of FIG. 10, strain gauge trace 84 has been formed on layer 90. Layer 90 may be a layer on structure 88 (e.g., a dielectric coating layer, a layer of light-sensitive polymer, a flexible printed circuit substrate or other substrate that is attached to structure 88 using adhesive, welds, fasteners, and/or other attachment mechanisms, etc.).

Figure 11:
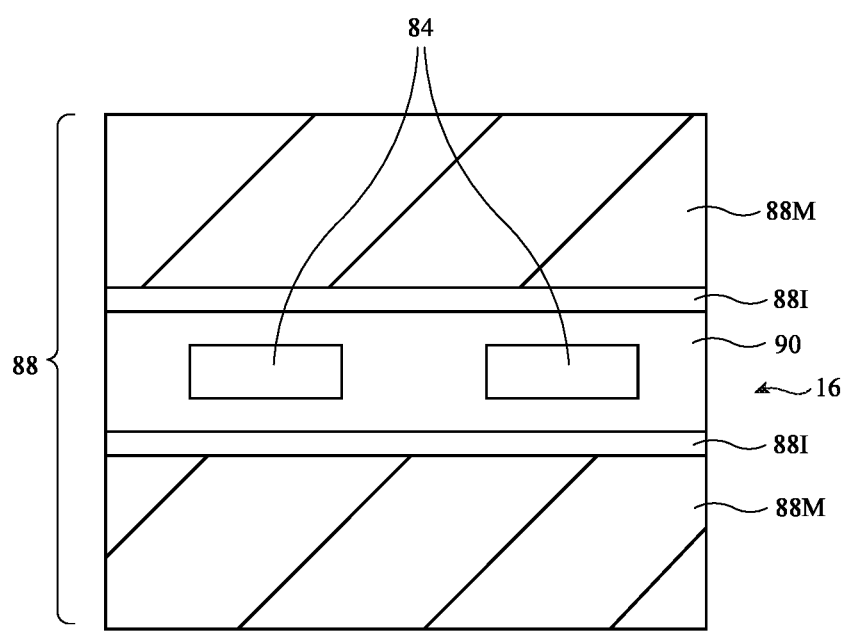

FIG. 11 is a cross-sectional side view of an illustrative structure in device 10 (structure 88) showing how a sensor such as strain gauge may be embedded within the structure. Structure 88 may, as an example, have portions 88M (e.g., metal portions) and portions 88I (e.g., insulating portions formed from polymer or other dielectric). Sensor 16 may be a strain gauge formed from strain gauge trace 84 (e.g., a metal trace) formed in insulator 90 (e.g. a layer of polymer sandwiched between layers 88I). In general, strain gauge sensors may be embedded within structures such as structure 88 forming housing 12, forming optical component packages (e.g., portions of optical modules 40, portions of cameras 46), and/or other structures in device 10.

Figure 12:
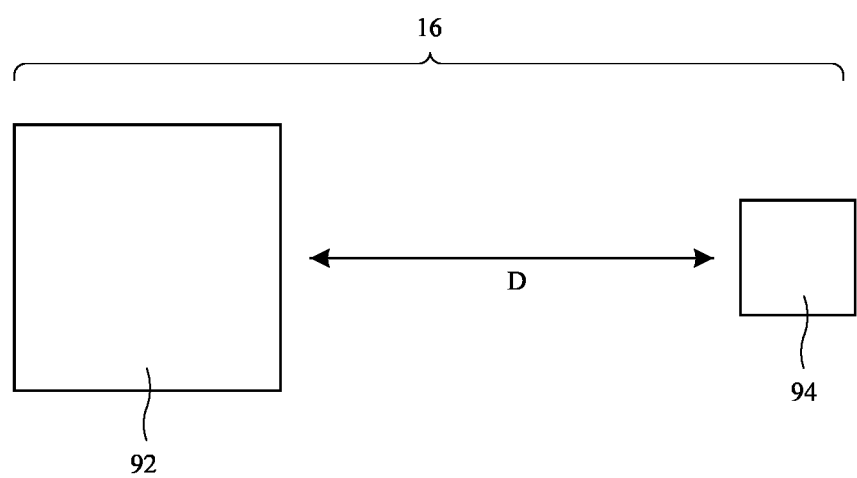
FIG. 12 is a side view of an illustrative magnetic sensor in accordance with an embodiment.
Figure 13:
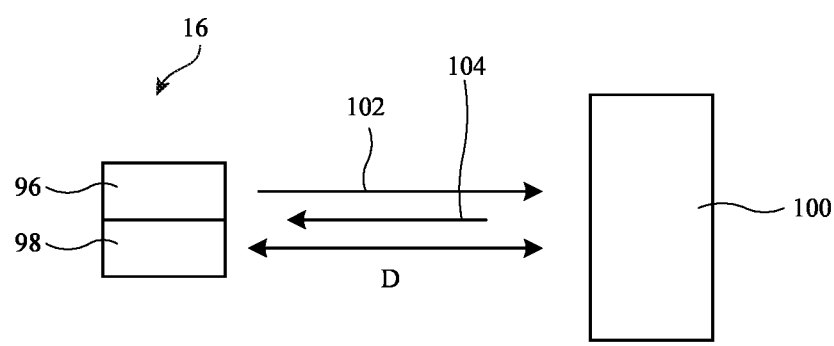
FIG. 13 is a cross-sectional side view of an illustrative sensor that uses time-of-flight measurements in accordance with an embodiment.

FIG. 12 is a cross-sectional side view of an illustrative magnetic sensor. Sensor 16 includes a permanent magnet such as magnet 94 and a magnetic sensing device such as a Hall effect sensor or other sensor that can measure magnetic fields (e.g. magnetic sensor 92). The measured magnetic field strength at sensor 92 is a function of distance D between magnet 94 and sensor 92, thereby allowing sensor 16 to measure distance D (as an example).

Time-of-flight measurements may be made using sensor 16, if desired. Consider, as an example, sensor 16 of FIG. 13. Sensor 16 of FIG. 13 includes a signal emitter such as source 96 and a signal sensor such as detector 98. During operation, source 96 emits signal 102 (e.g., a pulse) and detects reflected signal 104 (e.g., the pulse following reflection of the pulse from the surface of structure 110 in device 10 (e.g., a portion of support structure 12, optical modules 40, cameras 46, or other structure in device 10). The emitted signal from source 96 may be an optical signal (light), an acoustic signal (sound such as an ultrasonic acoustic signal), or a radio-frequency signal (e.g., a signal having a frequency of 1 MHz-100 GHz or other suitable radio frequency). Detector 98 (e.g., a photodetector sensitive to light, a microphone sensitive to sound, or an antenna sensitive to radio-frequency signals) measures the time at which reflected signal 104 is received relative to the time at which source 96 emitted signal 102. Using the known speed of propagation of signals 102 and 104 and the measured time of flight of the emitted signal (e.g., the time between pulse transmission and pulse reception), sensor 16 and/or control circuitry 20 can determine the distance D between sensor 16 and structure 100.

Figure 14:
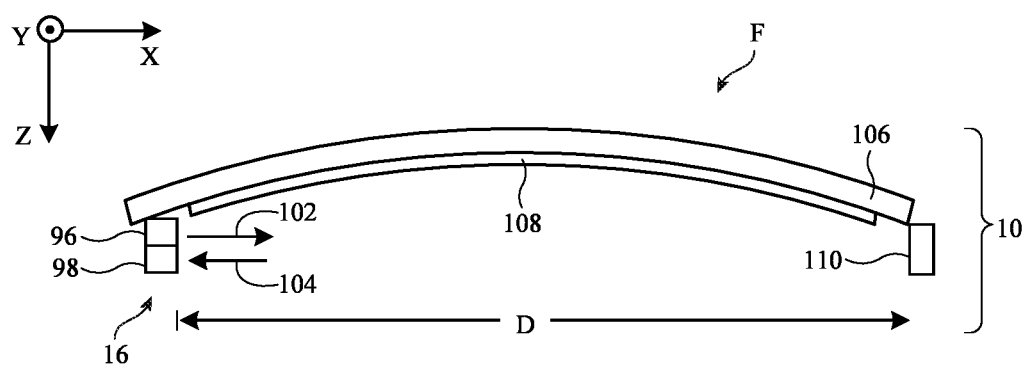
FIG. 14 is a cross-sectional side view of an illustrative head-mounted device structure being monitored by a sensor such as a time-of-flight sensor or other sensor in accordance with an embodiment.

If desired, a front-facing display and/or other components (e.g., a touch sensor layer) may be provided on front face F. For example, housing portion 12M may include a display cover layer that forms a front member that covers front face F. As shown in FIG. 14, a display cover layer (e.g., a display cover layer with a curved cross-sectional profile or other suitable shape) such as display cover layer 106 (e.g., a front portion of housing portion 12M) may overlap a pixel array such as pixel array 108 (sometimes referred to as a display, display layer, display panel, etc.). Pixel array 108 may be a liquid crystal display panel, an organic light-emitting display panel, a display panel with other light-emitting diodes, etc.

Display cover layer 106 may be formed from a layer of glass, clear polymer, or other transparent material that allows pixel array 108 to be viewed through display cover layer 106. During operation, pixel array 108 may be used in presenting images on front face F (e.g., images that are viewable by the user when device 10 is not being worn on the user's head and images that are viewable by nearby people when device 10 is being worn on the user's head). To detect bending of display cover layer 106, which may cause cameras 46 or other optical components mounted on or adjacent to display cover layer 106 to become misaligned with respect to each other or which may be indicative of bending of housing portion 12M that causes optical modules 40 to become misaligned with respect to each other and/or with respect to cameras 46, display cover layer 106 may be provided with one or more sensors such as sensor 16.

Sensor 16 on display cover layer 106 of FIG. 14 may be, for example, a time-of-flight sensor having a signal emitter such as source 96 and a signal detector such as detector 98. During measurement operations, control circuitry 20 may use source 96 to emit signal 102. Signal 102 may reflect from reflector 110 as reflected signal 104, which is detected by detector 98. Reflector 110 may be a structure in housing portion 12M such as a portion of display cover layer 106 or a mirror or other structure that is attached to display cover layer 106. The time of flight of the signal from source 96 to reflector 110 and back to detector 98 may be used to compute distance D (e.g., the distance separation different portions of housing portion 12M such as different left and right side portions or top and bottom portions of display cover layer 106). If bending or other deformation of display cover layer 106 that is associated with image misalignment is detected, compensating adjustments may be made by control circuitry 20.

Figure 15:
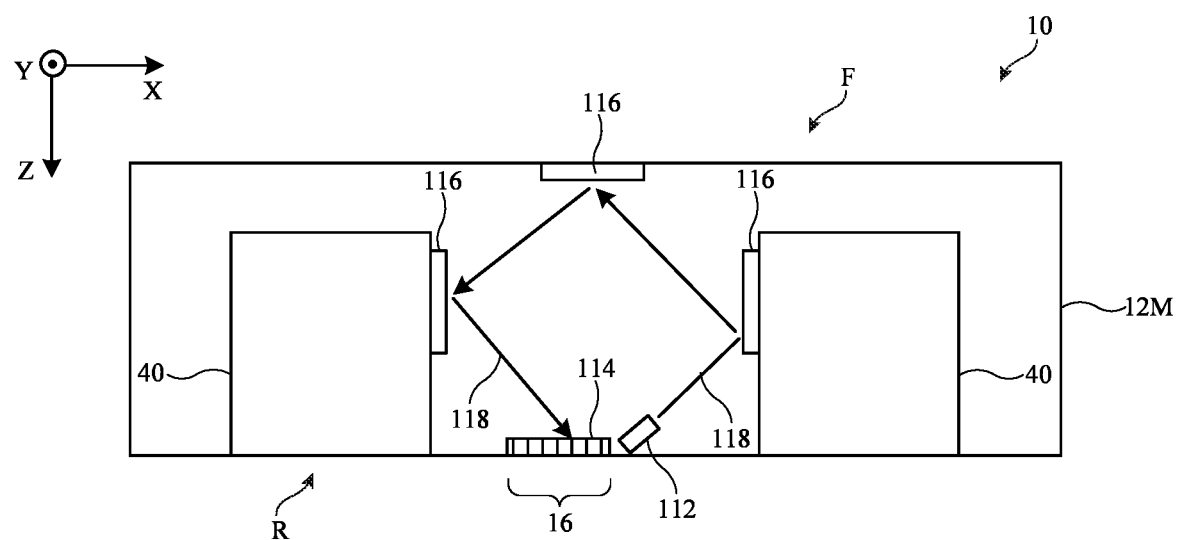
FIG. 15 is a cross-sectional side view of an illustrative sensor arrangement with a light beam that reflects from reflective surfaces in a head-mounted device in accordance with an embodiment.

In the illustrative configuration of FIG. 15, sensor 16 has a light source such as source 112. Light source 112 may be, for example, a light-emitting diode or a laser that emits a beam of light such as light beam 118. Device 10 may be configured so that light beam 118 reflects from multiple structures in housing portion 12M (e.g., multiple reflectors 116) before being detected by detector 114 of sensor 16. Structures 116 may be mirrors or reflective portions of a chassis or other structural support in housing portion 12M, reflective portions of optical modules 40, a reflective rear portion of a display cover layer or other structure on front face F of device 10, and/or other optical component structures and/or housing structures in device 10. Detector 114 may have an array of photodetectors (e.g., a one-dimensional or two-dimensional array of photodiodes), allowing detector 114 to detect the position at which light beam 118 strikes detector 114. During operation, deformation of housing portion 12M and/or components in device 10 (e.g., changes in the positions of optical modules 40 in the example of FIG. 15) may result in image misalignment. This misalignment may be detected by detecting changes in the position at which light beam 118 illuminates the photodetector array of sensor 114.

Figure 16:
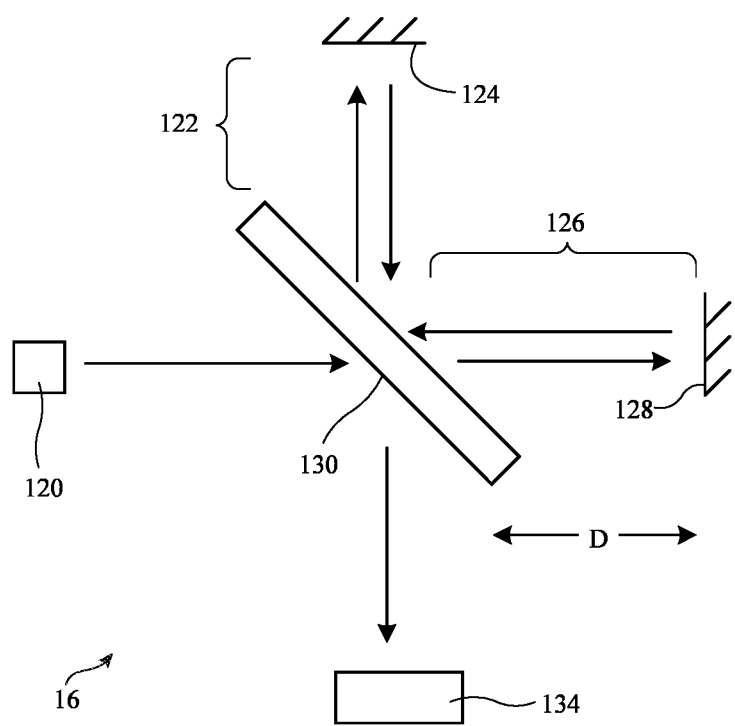
FIG. 16 is a diagram of an illustrative optical sensor such as an optical interferometer sensor in accordance with an embodiment.

If desired, interferometry (e.g., optical interferometry) may be used in measuring misalignment. Consider, as an example, the interferometer of FIG. 16. As shown in FIG. 16, laser interferometer sensor 16 of FIG. 16 may have a coherent light source such as laser 120. A first portion of the light emitted by laser 120 may pass through beam splitter 130, may travel along first interferometer arm 126, may reflect from structure 128, may reflect from beam splitter 130, may travel along second interferometer arm 122, may reflect from structure 124, and may pass through beam splitter 130 before reaching light detector 134. A second portion of the light emitted by light source 120 may reflect from beam splitter 130 toward light detector 114. Changes in distance D affect the length of interferometer arm 126 and therefore affect the phase of the first portion of the light reaching detector 134. As a result of interference between the first and second portions of the coherent light reaching detector 134, the relative phase of the first and second portions of light (and therefore changes in distance D) can be measured by sensor 16. Structure 128 may be a portion of housing 12M, a portion of an optical module or other optical component, or other structure in device 10 from which it is desired to gather a distance measurement.

Figure 17:
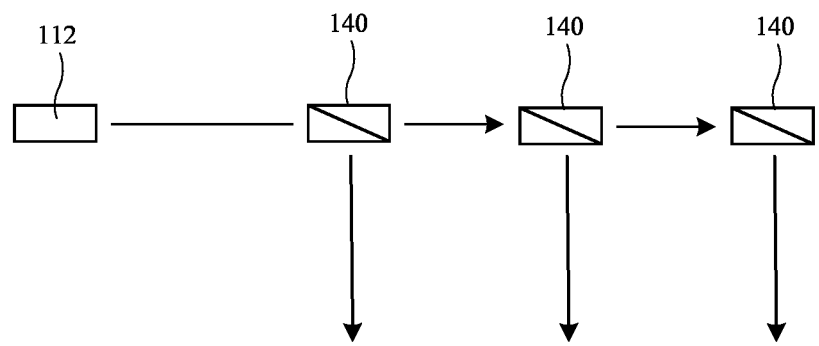
FIG. 17 is a diagram of illustrative optical sensing components such as prisms in accordance with an embodiment.

If desired, a single light source (e.g. laser 112 of FIG. 16) may be using in making multiple optical measurements (e.g., multiple time-of-flight measurements, multiple light beam angle measurements of the type described in connection with FIG. 15, multiple interferometric measurements, etc.). Optical couplers (e.g., beam splitters, prisms, gratings, etc.) may be used in dividing a single light beam from laser 112 into multiple light beams to use in one or more of these measurements, thereby reducing the number of light sources used in device 10. An illustrative configuration in which three prisms 140 are being used to split a single beam from laser 112 into three respective misalignment measurement beams is shown in FIG. 17.

Figure 18:
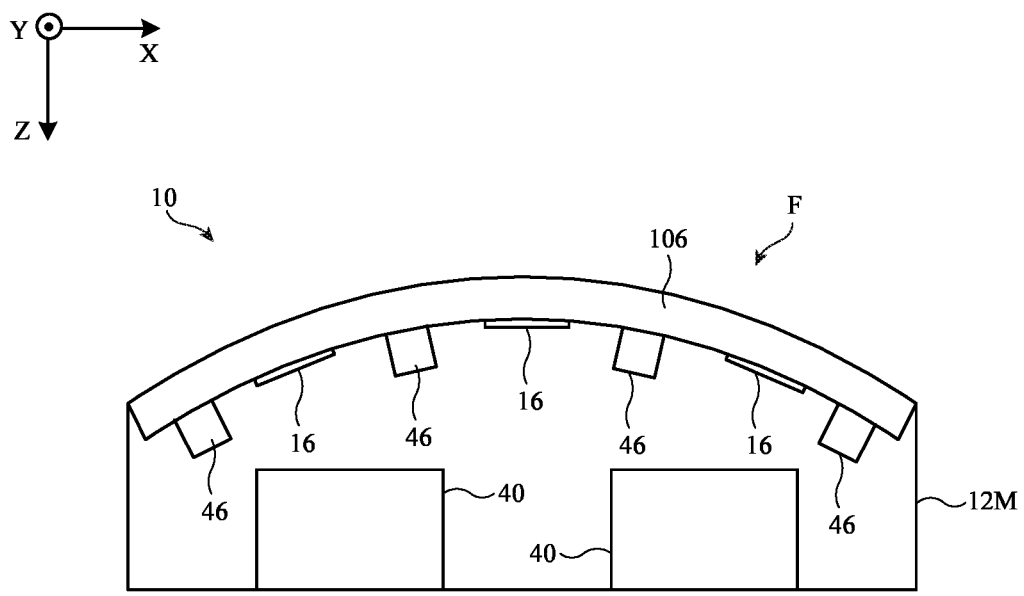
FIG. 18 is a cross-sectional side view of a portion of a head-mounted device with sensors in accordance with an embodiment.
Figure 19:
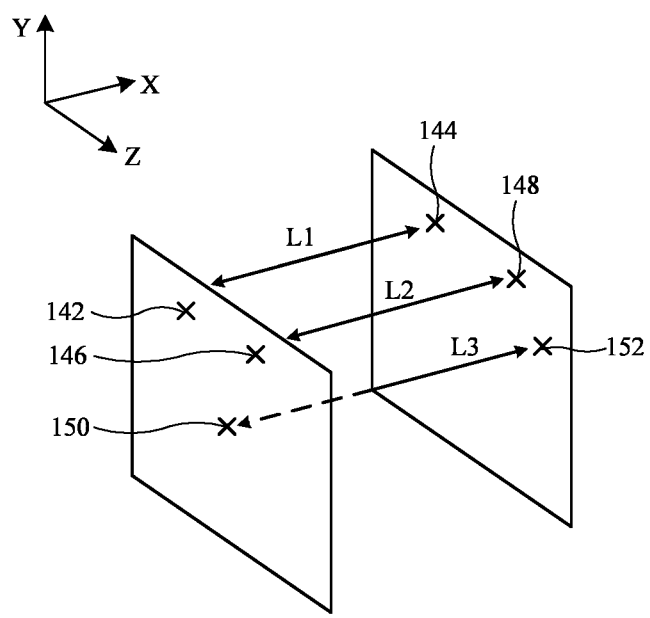
FIG. 19 is a perspective view of an illustrative sensor arrangement for an electronic device in accordance with an embodiment.

As described in connection with FIG. 14, front-facing cameras 46 and/or other optical components may be mounted on or adjacent to a portion of housing portion 12M such as display cover layer 106. This may help align the front-facing cameras or other optical components. To detect misalignment of images being captured by cameras 46, sensors 16 may be coupled to display cover layer 106. As shown in FIG. 18, for example, front-facing cameras 46 may be mounted to the inner surface of display cover layer 106 and may operate through display cover layer 106. Placing cameras 46 against display cover layer 106 in this way may help align cameras 46 (e.g., left and right forward-facing cameras in device 10) and may help align the images produced by these cameras. Sensors 16 may be strain gauges formed from metal traces on the inner surface of display cover layer 106 or may be strain gauges attached to the inner surface of display cover layer 106 by adhesive (as an example). In the event that display cover layer 106 deforms during operation of device 10, the misalignment of the images being captured by cameras 46 can be detected in real time. This allows compensating actions to be taken on the misaligned images (e.g., image warping operations on the image data may be performed). Sensors 16 may be attached to the inner surface of display cover layer 106 between each pair of respective cameras 46 and/or at other locations. If desired, deformation of housing portion 12M such as deformation of display cover layer 106 may be used in compensating for optical module misalignment (e.g., in arrangements in which bending of display cover layer 106 is associated with misalignment between the images from modules 40 and eye boxes 30).

If desired, multiple sensors 16 may be used to measure the orientation between optical components and/or other structures in device 10 (e.g., by triangulation). Consider, as an example, the scenario of FIG. 19. In this example, optical modules 40 include left and right modules. The orientation between a right-facing surface of a left optical module (surface LH) and a corresponding left-facing surface of a right optical module (surface RH) is being measured using three sensors 16 (e.g., three distance sensors such as optical sensors or other sensors 16 of the types described in connection with FIGS. 4-18). For example, a first distance sensor may measure a first distance L1 between point 142 on surface LH and corresponding point 144 on surface RH, a second distance sensor may measure a second distance L2 between point 146 on surface LH and corresponding point 148 on surface RH, and a third distance sensor may measure a third distance L3 between point 150 on surface LH and corresponding point 152 on surface RH. By using these three distance measurements (L1, L2, and L3), the relative orientation in X, Y, and Z (including any relative tilt about each of these axes and any changes in position) between the left and right optical modules 40 (and/or any other pair of structures in device 10) can be determined.

Figure 20:
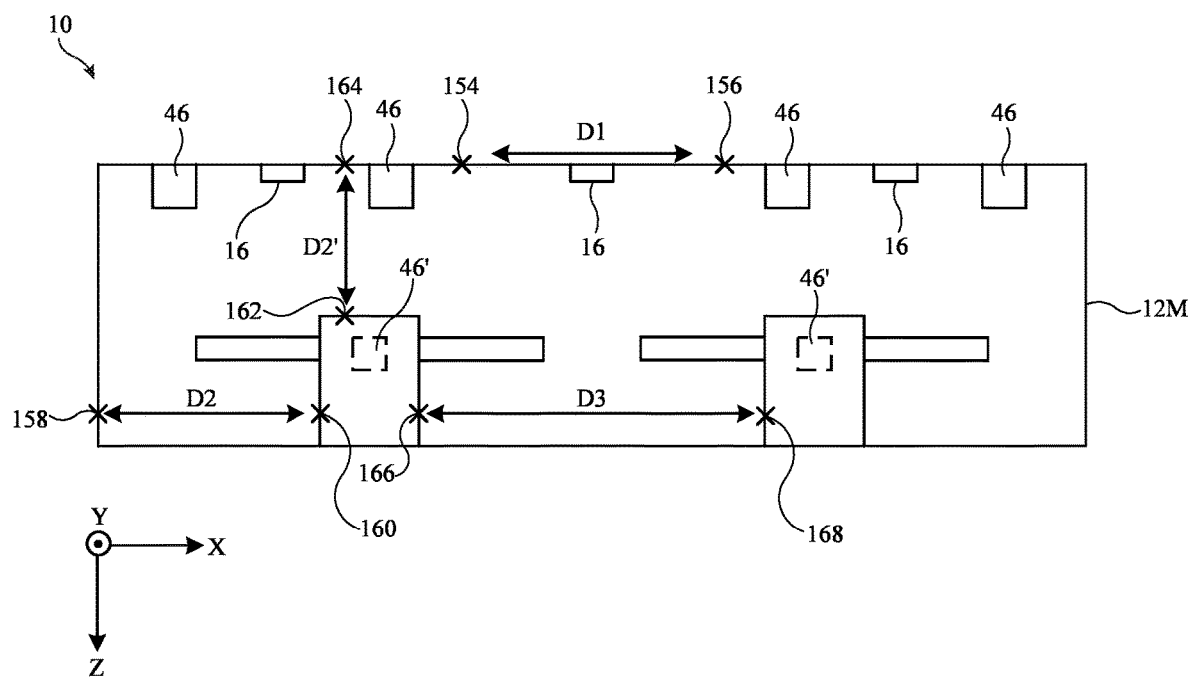
FIG. 20 is a top view of an illustrative head-mounted device with sensors in accordance with an embodiment.

In general, the relative positions (including displacement and/or angle) between any pair of structures in device 10 can be measured using one or more sensors 16. Consider, as an example, device 10 of FIG. 20. As shown in FIG. 20, sensors 16 such as strain gauges on front face F of housing portion 12M and/or other structures in device 10 may measure image misalignment associated with images captured by forward facing cameras 46. Sensors 16 may, for example, measure distance D1 (and/or orientation angle) between points 154 and 156 on display cover layer 106 (or other portion of housing portion 12M). Additional sensors 16 may measure distances (and/or orientation angles) such as distance D2 (and/or angle) between point 158 (e.g., a portion of a rigid frame in cover 12C, a chassis structure such as a rigid frame in housing portion 12M, a left housing wall, etc.) and point 160 (e.g., a portion of lens barrel 32 or other optical module structure for a left optical module 40), distance D2' (and/or angle) between point 162 (e.g., a portion of left optical module 40) and point 164 (e.g., a portion of housing portion 12M such as a portion of display cover layer 106), distance D3 (and/or angle) between point 166 (e.g., a portion of a left optical module 40) and point 168 (e.g., a portion of a right optical module 40), and/or other distances and/or angles between respective portions of device 10. As these examples demonstrate, one or more sensors 16 may be used in measuring the relative orientation between a head-mounted support structure of device 10 (e.g., a chassis or other device housing structure) and an optical component such as optical module 40, between a pair of optical modules 40, and/or between different portions of a head-mounted support structure. In configurations in which left and right forward-facing cameras 46 are mounted to respective left and right optical modules 40 (e.g., in positions 46' of FIG. 20), measuring the relative orientation between optical modules 40 serves to measure the relative orientation between the forward-facing cameras. In configurations in which forward-facing cameras 46 are mounted elsewhere in device 10, sensors 16 can measure the relative position between cameras 46, the position between each camera 46 and housing portion 12M, and/or the relative position between each camera 46 and each optical module 40 (as examples).

Misalignment between respective cameras (and the images captured by the cameras) between a given camera and a given optical module (and their associated images), and/or between respective optical modules may be measured directly (e.g., by an associated sensor) or indirectly (e.g., by using a first sensor to detect a first misalignment such as a misalignment between a first component and housing portion 12M and to detect a second misalignment such as a misalignment between housing portion 12M and a second component, thereby producing misalignment information corresponding to misalignment between the first and second components).

Figure 21:
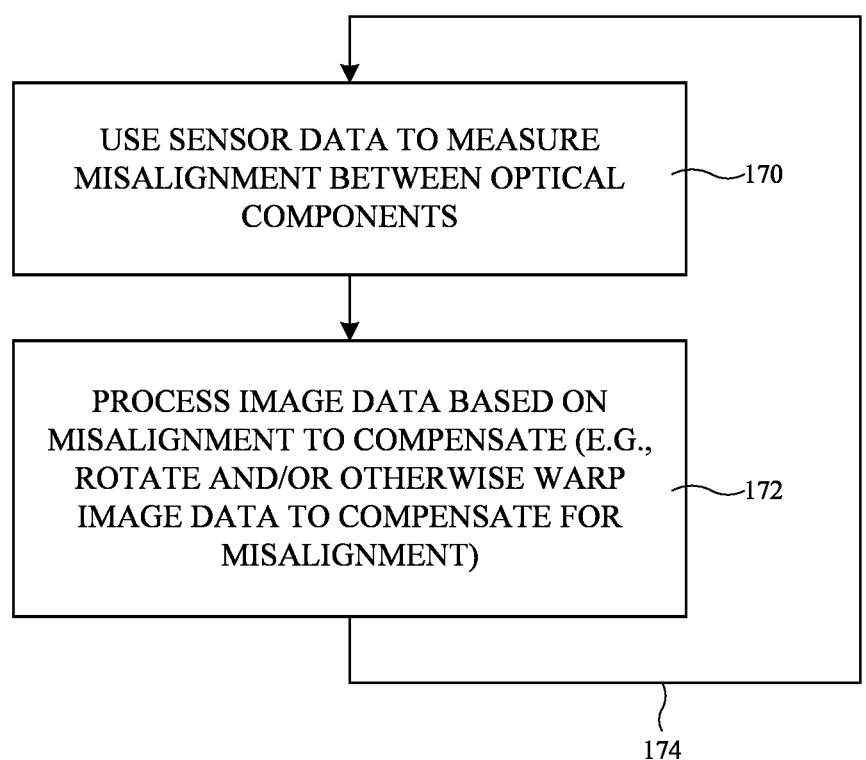
FIG. 21 is a flow chart of illustrative operations associated with operating an electronic device in accordance with an embodiment.

Illustrative operations involved in operating device 10 are shown in FIG. 21.

During the operations of block 170, sensors 16 may be used to gather information on the orientation of optical components in device 10. Each optical component (e.g., each camera 46, each optical module 40, etc.) may have a respective sensor 16 and/or sensors 16 may measure support structure deformation that is associated with changes in the orientations of the optical components. This allows optical-component-to-optical-component misalignment to be monitored. If desired, structures in housing portion 12M (e.g., a display cover layer, a frame or other chassis structure, and/or other optical component support structures, etc.) may be provided with one or more sensors 16 and/or one or more sensors 16 may be used in measuring optical-component-to-support-structure orientation. In this way, optical-component-to-optical component misalignment and corresponding image misalignment may be measured directly or indirection. Position measurements may be associated with camera-to-camera alignment, camera-to-optical-module alignment, camera-to-housing alignment, optical module-to-housing alignment, optical-module-to-optical-module alignment, and/or housing-to-housing alignment and each of these measurements may be associated with potential misalignment between images, between an image and an eye box, etc.

During the operations of block 172, control circuitry 20 may process image data (captured images from cameras 46 and/or displayed images on optical modules 40) to compensate for misalignment measured by sensors 16 during the operations of block 170. For example, if it is determined that an optical module (e.g., a right-hand optical module) is presenting an image that has become rotated counterclockwise by angle A relative to an eye box, compensating image warping may be performed on the image to rotate the image clockwise by angle A and thereby compensate for the misalignment. Camera images may likewise be warped. The image warping transforms that are applied during misalignment compensation operations may include geometrical transforms such as shifts, shears, rotations, etc.

Consider, as an example, a scenario in which sensors 16 determine that first and second optical components (e.g., a pair of cameras 46, a pair of modules 40, a camera and a module, etc.) are misaligned with respect to each other. During the image compensation operations of block 172, control circuitry 20 may, based on the measured misalignment, warp a first image captured by or displayed by the first optical component and/or may warp a second image captured by or displayed by a second optical component, thereby compensating the images for the measured misalignment.

As shown by line 174, the optical component orientation measurements of block 172 to detect component and image misalignment and the corresponding misalignment compensation image processing adjustments that are performed at block 172 may be performed continuously (e.g., upon detection of a drop event, upon power up, in response to a user-initiated calibration sequence during which a user is asked to move device 10 so that sensors 60 can detect misalignment, in accordance with a predetermined schedule, etc.).

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, pLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:
   a head-mounted housing;
   a camera supported by the head-mounted housing;
   a display supported by the head-mounted housing and configured to display an image; and
   a sensor configured to measure misalignment of at least one of the camera or the display, wherein the displayed image is compensated for the measured misalignment and wherein the sensor is selected from the group consisting of:
   a resistance-based sensor that measures a deformation of the head-mounted housing;
   an emitter that illuminates a target and a detector that detects light reflected from the target; and
   an optical interferometer having a beam splitter that splits light into first and second light beams, wherein the optical interferometer is configured to measure a relative phase of the first and second light beams.

2. The head-mounted device defined in claim 1 further comprising control circuitry configured to apply image warping to the displayed image to compensate for the measured misalignment.

3. The head-mounted device defined in claim 1 wherein the displayed image comprises an image captured by the camera.

4. The head-mounted device defined in claim 1 wherein the camera is configured to capture images of real-world objects, wherein the displayed images comprise virtual image content that is registered to the real-world objects based on the captured images.

5. A head-mounted device, comprising:
   a head-mounted housing;
   a camera supported by the head-mounted housing;
   a display supported by the head-mounted housing and configured to display an image;
   a sensor configured to measure misalignment of at least one of the camera or the display, wherein the displayed image is compensated for the measured misalignment; and
   an additional display supported by the head-mounted housing, wherein the display and the additional display face opposite directions.

6. The head-mounted device defined in claim 5 wherein the sensor is selected from the group consisting of: a strain gauge, an optical sensor, a radio-frequency sensor, an acoustic sensor, an orientation sensor, and a magnetic sensor.

7. The head-mounted device defined in claim 5 further comprising a display cover layer overlapping the additional display, wherein the sensor is coupled to the display cover layer and is configured to measure deformation of the display cover layer.

8. A head-mounted device, comprising:
a head-mounted housing;
a camera supported by the head-mounted housing;
a display supported by the head-mounted housing;
a transparent housing layer on which images from the display are viewable; and
a sensor coupled to the transparent housing layer and configured to detect deformation of the transparent housing layer, wherein at least one of the camera or the display are adjusted to compensate for deformation of the transparent housing layer, and wherein the camera captures images through the transparent housing layer.

9. The head-mounted device defined in claim 8 wherein the transparent housing layer comprises a display cover layer.

10. The head-mounted device defined in claim 8 wherein the captured images are compensated based on the deformation of the transparent housing layer.

11. A head-mounted device, comprising:
a head-mounted housing;
a camera supported by the head-mounted housing;
a display supported by the head-mounted housing;
a transparent housing layer on which images from the display are viewable; and
a sensor coupled to the transparent housing layer and configured to detect deformation of the transparent housing layer, wherein at least one of the camera or the display are adjusted to compensate for deformation of the transparent housing layer, and wherein the sensor comprises a strain gauge.

12. A head-mounted device, comprising:
a head-mounted housing;
a display supported by the head-mounted housing;
a transparent housing layer on which image content from the display is viewable;
first and second forward-facing cameras that capture images through the transparent housing layer; and
a sensor configured to detect misalignment between the first and second forward-facing cameras, wherein at least one of the displayed image content or the captured images is compensated based on the measured misalignment.

13. The head-mounted device defined in claim 12 wherein the sensor comprises a strain gauge configured to measure a distance between a first portion of the transparent housing layer and a second portion of the transparent housing layer.

14. The head-mounted device defined in claim 12 further comprising control circuitry configured to apply image warping to the captured images to compensate for the measured misalignment.

15. The head-mounted device defined in claim 12 further comprising an additional display supported by the head-mounted housing, wherein the display and the additional display face opposite directions.

16. The head-mounted device defined in claim 15 wherein the additional display is configured to display virtual image content that is registered to real-world objects based on the captured images.

* * * * *